United States Patent
Matuska

[15] 3,666,214
[45] May 30, 1972

[54] QUICKLY REMOVABLE, PIVOTAL, AND SNUBBED STORAGE BIN

[72] Inventor: James E. Matuska, 13515 25th N.E., Seattle, Wash. 98125

[22] Filed: Nov. 9, 1970

[21] Appl. No.: 88,182

Related U.S. Application Data

[63] Continuation of Ser. No. 744,933, July 15, 1968, abandoned.

[52] U.S. Cl. .................................244/118 P, 16/82, 312/328
[51] Int. Cl. ..............................................................B64d 11/00
[58] Field of Search .....................244/118 P, 118 R, 129 R; 16/82, 44; 297/425; 308/426, 2; 312/319, 327, 328; 232/43.2, 28; 108/38, 40, 48; 220/1 T

[56] References Cited

UNITED STATES PATENTS

| 393,472 | 11/1888 | Jeffries | 297/426 |
|---|---|---|---|
| 964,540 | 7/1910 | Niemeyer et al. | 105/325 |
| 1,249,488 | 12/1917 | Posson | 105/325 |
| 2,242,201 | 5/1941 | Woods | 244/129 |
| 2,307,489 | 1/1943 | Coats | 308/2 |
| 2,369,148 | 2/1945 | Langhorst | 244/129 |
| 2,455,488 | 12/1948 | Holman | 16/63 |
| 2,619,395 | 11/1952 | Kent | 108/38 |
| 3,157,446 | 11/1964 | Stark | 312/328 |
| 3,273,938 | 9/1966 | Jacobi | 297/426 |
| 3,377,110 | 4/1968 | Boggs | 308/2 |

Primary Examiner—Trygve M. Blix
Attorney—Theron H. Nichols

[57] ABSTRACT

An easily and quickly removable, pivotal, and snubbed storage bin, such as for aircraft passenger carry-on luggage having axially retractable pivotal pins extendible from the bin into recesses in support structure, as in an aircraft passenger transport, in a nonrotatable fitting and a snubber pivotally connected between the bin and the pin for snubbing relative movement between the bin and its pivot pin and accordingly between the bin and the support structure. Also disclosed is a quickly retractable and snubbing pivot pin mechanism comprising an extendible means, snubbing means, and link means nonrotatably and slideably connected to the extendible pin means and pivotally connected to the snubbing means.

17 Claims, 5 Drawing Figures

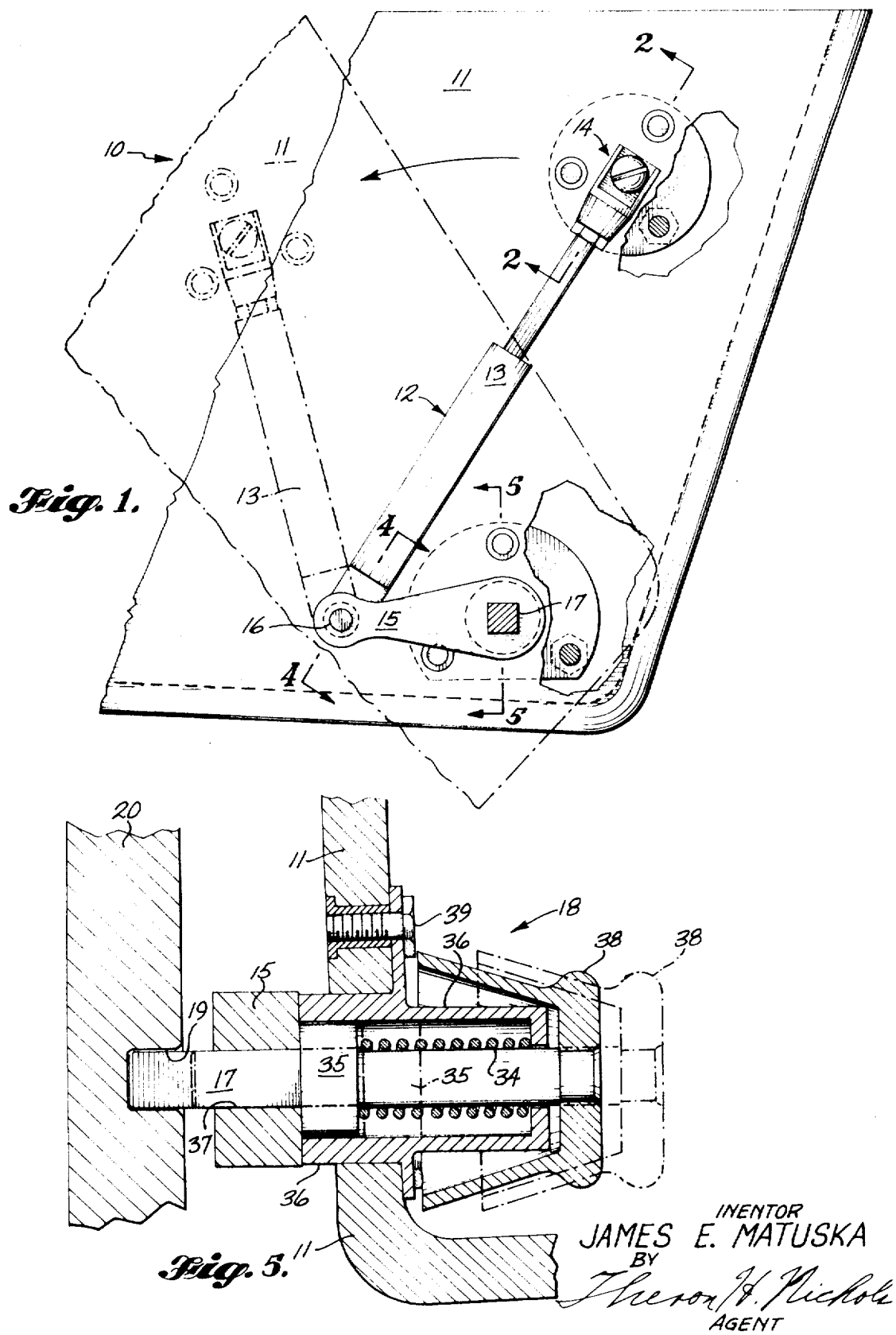

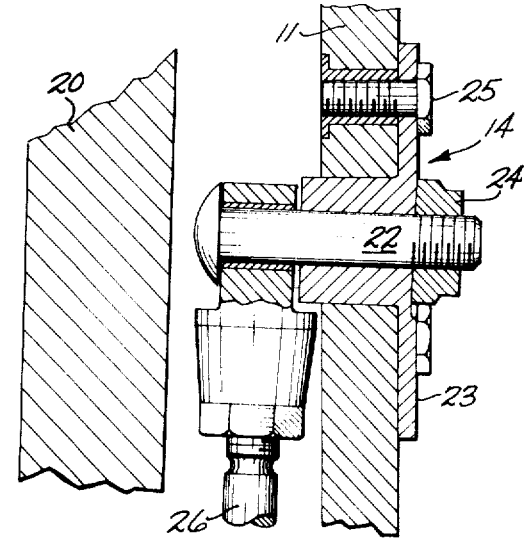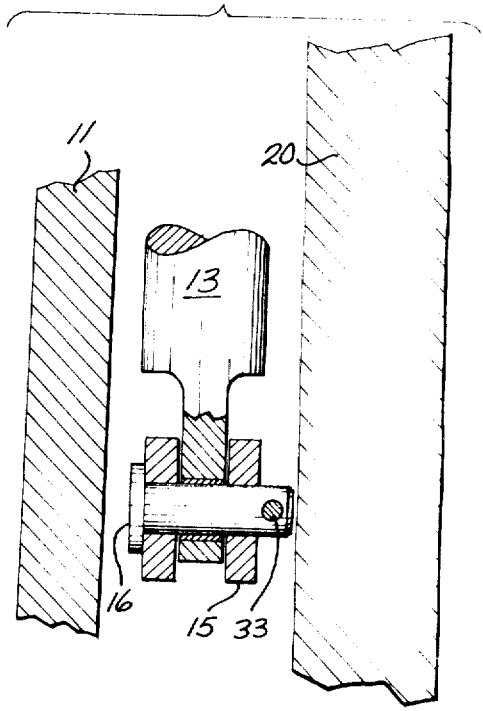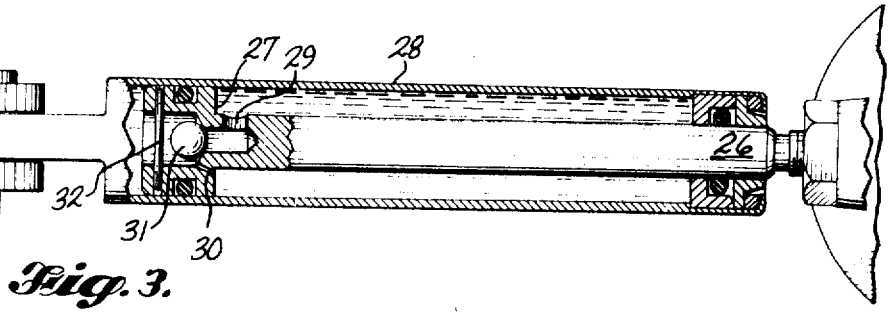

3,666,214

1

QUICKLY REMOVABLE, PIVOTAL, AND SNUBBED STORAGE BIN

This application is a continuation of application Ser. No. 744,933 filed July 15, 1968 and now abandoned.

BACKGROUND OF THE INVENTION

FIELD OF THE INVENTION

This invention is classified in Class 244, Subclass 118 "Arrangements on aircraft particularly designed to improve the convenience or efficiency with which passengers or cargo are carried," and Cross-referenced in Subclass 131 "Details—joints and connections peculiar to aircraft or incorporated with aircraft structure."

SUMMARY OF THE INVENTION

This invention pertains to a new and novel storage bin which comprises a removable, snubbing pivot pin at each side which pivotally support a storage bin so that any and free downward tilting movement of the bin for access thereof is shock absorbingly controlled upon release of a suitable latch, for example, and the fully loaded bin is only allowed to slowly tilt to fully opened position. But, while downward opening movement is efficaciously snubbed, the bin may be closed or pivoted back to its original horizontal position with no appreciable resistance from the snubber.

Likewise, the storage bin is quickly removable by mere inward pulling of knobs on the pivot pins for changing, cleaning, or repair of the storage bins.

Also is disclosed a quickly, retractable, and extendable snubbing pivot pin mechanism for forming a highly efficient pivot for incorporation with a storage bin, particularly one for aircraft passenger carry-on luggage, and for being mounted in a storage bin supporting structure, as in an aircraft passenger transport, adjacent the passengers.

Accordingly, the principal object of this invention is to provide a quickly removable pivotal structure that may be pivotally connected to a support structure with retractable pivot pins.

A further object of this invention is to provide a quickly and easily removable pivotal structure for pivotally mounting on a support structure with means for snubbing the pivotal movement between the two structures.

Another main object of this invention is to provide a storage bin that is quickly removable, pivotal, and snubbed in its pivotal movement about its pivotal mount.

A still further object of this invention is to provide an aircraft passenger carry-on luggage storage bin pivotally mounted in an aircraft and being quickly and easily removable from the aircraft.

Still another object of this invention is to provide a quickly removable, retractable, and snubbing pivot pin mechanism for mounting a bin in a cavity.

Other objects and various advantages of the disclosed quickly removable, pivotal, and snubbed, storage bin will be apparent from the following detailed description, together with the accompanying drawings, submitted for purposes of illustration only and not intended to define the scope of the invention, reference being had for that purpose to the subjoined claims.

BRIEF DESCRIPTION OF THE FIGURES

The drawings diagrammatically illustrate by way of example, not by way of limitation, one form of the invention wherein like reference numerals designate corresponding parts in the several views in which:

FIG. 1 is a side view, with parts in section, of the rear portion of the new storage bin shown in horizontal position in solid lines end in lowered unloading position in broken lines;

FIG. 2 is a sectional view taken at 2—2 on FIG. 1;

FIG. 3 is a side view of the snubber of FIG. 1, with parts in section;

FIG. 4 is a sectional view taken at 4—4 on FIG. 1; and

FIG. 5 is a sectional view taken at 5—5 on FIG. 1.

2

DESCRIPTION OF THE PREFERRED EMBODIMENT

FIG. 1 illustrated, with parts in section for clarity of disclosure, a side view of the rear portion of the new and novel quickly removable, pivotal, and snubbed storage bin 10.

Pivotal bin 10, FIG. 1, comprises a storage bin 11 combined and mounted in a quickly retractable and snubbing pivot pin mechanism 12, one mechanism for each side. While each part of the two mechanisms are identical, each mechanism is the enantiomorphic analogue of the other.

Each snubbing pivot pin mechanism 12, FIG. 1, comprises a snubber 13 pivotally connected at its upper end to the bin 11 with pivotal connection 14 and at its lower end to lever 15 with pivot pin 16. A shaft or pivot pin 17 of pivot pin device 18, FIG. 5, is nonrotatably but axially slideable in lever 15. From there the shaft or pivot pin 17 protrudes into a recess 19 in wall 20 of the bin supporting structure.

SNUBBER PIVOTAL CONNECTION 14

Pivotal connection 14 FIGS. 1 and 2, for connecting snubber 13, FIG. 1, to a side wall of the storage bin 11 comprises pivot pin or bolt 22, FIG. 2, passing through a hole in the upper end of a piston rod 26 of the snubber, through a flange 23, and retained with nut 24, the flange being secured to the bin wall with screws 25.

SNUBBER 13

Hydraulic snubber 13, FIGS. 1 and 3, comprises the piston rod 26, FIG. 3, actuatable by piston 27 slideable in cylinder 28. Piston rod 26 has a large orifice and passage 29 and small orifice 30 for fluid to pass from one side of the piston to the other. A ball 31 is retained internally of piston 27 by pin 32, the ball plugging the large orifice and passage when the fluid slowly flows to the right as the snubber is compressed and shortened, as viewed in FIG. 3, whereas fluid flow to the left is fast and friction free as the piston rod extends.

FIG. 4, a section taken at 4 — 4 on FIG. 1, illustrates the pivotal connection of the lower end or cylinder 28, FIG. 4, of the snubber 13 and left end of lever 15, FIG. 1, the latter being pivotally connected with pin 16, FIG. 4, passing through both and retained with locking pin or key 33.

PIVOT PIN DEVICE 18

FIG. 5, a section at 5 — 5 on FIG. 1 illustrates one of two pivot pin devices 18 of the overall snubbing pivot pin mechanism. Pin device 18 comprises a compression spring 34 around an intermediate portion of pin device shaft or pivot pin 17 compressed between an annular ridge 35 on the shaft and a wall surface internally of flange 36. The outer portion of shaft or pivot pin 17 is rectangular shaped and to the left of the ridge 35, FIG. 5, protruding from the flange 36, through a rectangular hole 37 in the lever 15, and terminating in the recess 19 in the bin supporting structure wall 20. The inner or right end of shaft 17 or pivot pin is round beginning with the annular ridge and extends internally of the bin to a round hole in the flange 36 and the shaft extends further therefrom the hole where a knob 38 is fixedly secured to the shaft inner end. Ridge 35, with its round outer surface, slideably actuates in a cylindrical cavity in the flange 36 enclosing the spring 34. Suitable bolts 39 secure the flange 36 to a side wall of the bin 11.

Thus in operation of the pivot pin device 18, compression spring 34 spring urges in an axial direction the square end of pivot pin 17 out of its flange 36, through lever 15, and into bin supporting structure wall 20, whereby while pivot pin 17 is prevented from rotating, the storage bin 11 and flange 36 may freely pivot and rotate about the pivot pin 17. Inward manual pulling of the knobs 38 of both pivot pin devices on each side of the storage pin compresses spring 34 to permit inward movement of the pivot pins 17, to the left in FIG. 5, a distance of slightly over the depth of the recess 19 of the supporting structure wall 20, whereby the storage bin may be easily and quickly removed for cleaning, changing, repair, etc.

OPERATION OF THE QUICKLY REMOVABLE, PIVOTAL, AND SNUBBED STORAGE BIN

With a snubbing pivot pin mechanism 12 attached to both sides of the storage bin 11 at the rear thereof and with release of a latch (not shown) for supporting the front portion of the bin, the bin front portion immediately tends to drop down with all its weight to an accessible position for aircraft passengers, for example, to retrieve their belongings and/or store more luggage in the storage bin before raising it back to stored position.

As the bin drops, pivots, or rotates counterclockwise about the pivot pin 17, FIG. 1, which shaft is nonrotatably fitted in the supporting structure recess 19, the lever 15 is held stationary relative to bin support structure 20, and the snubber 13 contracts as it pivots about pivot pin 16, when the pin pivotal connection 14 moves toward pin 16 as it rotates about pivot pin 17 to the broken line position illustrated in FIG. 1. Contraction of the snubber 13 is resisted as the piston 27, FIG. 3, moves to the left, the ball plugs the large orifice and passage 29, and fluid flows only through small orifice 30.

Then when the storage bin is emptied or refilled and raised back up to the normal horizontal position, the snubber is easily extended with negligiable resistance due to the snubber fluid passing through both the large orifice and passage and the smaller orifice in the piston as the snubber 13, FIG. 1, is actuated from the broken line position to the right to the solid line, horizontal position.

Thus it will be seen that the instant storage bin is quickly removable, pivotal, and snubbed in a manner which meets each of the objects set forth hereinbefore.

Having specifically described my invention, I do not desire to confine myself to the specific details of the constructional example herein shown and described as it is apparent that various modifications may be resorted to without departing from the broad principles of the invention as indicated by the scope of the following claims.

I claim:

1. A quickly removable passenger transport aircraft storage bin having two opposite sides, a walled cavity having walls adjacent said opposite sides in a passenger transport aircraft support structure for the storage bin, and means for pivotally and removably mounting the storage bin on the walled cavity support structure, said means comprising,
   a. pivot pin means extending from each of said two opposite sides of said storage bin into recesses in said adjacent walls of said support structure walled cavity,
   b. each of said pivot pin means fitting nonrotatably and axially slideable in said respective recesses to ensure easy and quick removability of said bin from said cavity whereby said passenger transport aircraft storage bin is pivotal about said pivotal pin means for receiving luggage therein, and
   c. both said pivotal pin means are axially slideably retractable for quickly and easily removing said storage bin from the passenger transport aircraft walled cavity support structure for quick repair, replacement, and / or cleaning.

2. A quickly removable passenger transport aircraft storage bin having two opposite sides for mounting in a walled cavity having walls adjacent the respective sides in a passenger transport aircraft, said aircraft bin comprising,
   a pivot pin means extending from each of said opposite sides of said bin into recesses into the respective adjacent walls of said passenger transport aircraft cavity whereby said bin is pivotable about said pivot pin means,
   b. spring means normally urging each of said pivot pin means axially slideable into each of said respective passenger transport aircraft recesses,
   c. each of said pivot pin means fitting nonrotatably and axially slideable in each of said respective recesses, and
   d. each of said pivot pin means being slideably retractable from said respective recesses in an axial direction whereby said bin is easily and quickly removable from said cavity.

3. A quickly removable passenger transport aircraft storage bin as recited in claim 2 wherein,
   a. elongated snubber means is connected between said bin and said nonrotatable pivot pin means for snubbing pivotal movement of said bin relative to said pivot pin means.

4. A quickly removable and snubbed passenger transport aircraft storage bin as recited in claim 3 wherein,
   a. said pivot pin means comprises a pivot pin which is spring urged axially from said bin into said passenger transport aircraft recess in said passenger transport aircraft cavity wall, and
   b. said pivot pin fitting nonrotatably in said recess to ensure easy and quick removability of said bin from said cavity.

5. A quickly removable passenger transport aircraft storage bin as recited in claim 2 wherein,
   a. said passenger transport aircraft recess comprises means for preventing rotational movement of said pivot pin means relative to said passenger transport aircraft cavity, and
   b. snubber means fixedly connected to said pivot pin means for snubbing pivotal movement of said bin relative to said cavity.

6. A quickly, removable rigid structure as recited in claim 5 wherein,
   a. the connection between said passenger transport aircraft snubber means and said pivot pin means is a lever, and
   b. one end of said lever being slidable on said pivot pin means in an axial direction and nonrotatably mounted on said pivot pin means, and the other end of said lever being pivotally connected to said snubber means.

7. A quickly removable passenger transport aircraft rigid structure as recited in claim 1 wherein,
   a. said rigid structure is a storage bin for aircraft passenger carry-on luggage and said support structure is a wall cavity in the passenger compartment of a passenger transport aircraft,
   b. said storage bin being pivotal about said pivotal pin means for receiving passenger carry-on luggage therein, and
   c. said pivotal pin means being retractable for quickly removing said storage bin from the aircraft for quick repair, replacement, and/or cleaning.

8. A quickly removable passenger transport aircraft storage bin as recited in claim 2 wherein,
   a. snubber means is connected between said storage bin and said retractable pivot pin means, and
   b. said snubber means being responsive to said pin means for snubbing movement of said storage bin relative to said passenger transport aircraft cavity.

9. A quickly removable passenger transport aircraft storage bin as recited in claim 2 wherein,
   a. lever means connects one end of a snubber means to said pivot pin means in said passenger transport air craft recess in said passenger transport aircraft cavity, the other end of said snubber means being pivotally connected to said storage bin, and
   b. said snubber means being responsive to said lever means for snubbing movement of said storage bin relative to said cavity.

10. In a quickly removable passenger transport aircraft storage bin as recited in claim 9 wherein,
    a. one end of said lever means is slidable on said pin means in an axial direction and the other end of said lever means is pivotally connected to said snubber means whereby said storage bin is easily and quickly removable from said passenger transport aircraft cavity.

11. A quickly removable storage bin in the passenger transport aircraft as recited in claim 2 wherein,
    a. an elongated snubber is pivotally connected at one end to said passenger transport aircraft storage bin,
    b. lever means connecting the other end of said snubber to said pivot pin means, and c. said connecting lever means and said pivot pin means being responsive to said snubber for snubbing relative movement between said storage bin and said passenger transport aircraft cavity.

12. A quickly removable and snubbed passenger transport aircraft storage bin as recited in claim 11 wherein,
   a. said connecting lever means is nonrotatably connected to said pivot pin means.

13. A quickly removable and snubber passenger transport aircraft storage bin as recited in claim 11 wherein,
   a. said connecting lever means is slidably connected to said pivot pin means in an axial direction.

14. A quickly removable and snubbed passenger transport aircraft storage bin as recited in claim 11 wherein,
   a. said connecting lever means comprises a lever having one end pivotally connected to said snubber, and
   b. the other end of said lever being nonrotatably and slidably connected to said pivot pin means.

15. A quickly removable aircraft storage bin having two opposite sides for aircraft passenger carry-on luggage for mounting in an aircraft walled cavity having walls adjacent said opposite sides in a passenger transport aircraft, the bin comprising,
   a. a pivot pin nonrotatably extendable and slideable in an axial direction from said two opposite sides of said bin into a recess in said respective adjacent walls of said cavity,
   b. said pivot pins being spring urged axially and slideably from the respective sides of said bin, and
   c. said pivot pins being slideably retractable from said aircraft recesses in an axial direction whereby said bin is easily and quickly removable from said aircraft cavity.

16. A quickly removable aircraft storage bin as recited in claim 15 wherein,
   a. one end of an elongated snubber is pivotally connected to said bin,
   b. the other end of said snubber is pivotally connected to a lever, and
   c. said lever is nonrotatably connected to said pin for snubbing pivotal movement of said bin relative to said aircraft walled cavity.

17. An aircraft storage bin having two opposite sides for an aircraft walled cavity having walls adjacent said two sides comprising,
   a. slideably retractable pivot pin means extendable axially to and from said sides of said bin and slideably extendable axially into a recess in each of said respective aircraft cavity walls for ease and quickness of removing said aircraft bin from said aircraft cavity, and
   b. snubber means between said bin and at least one of said retractable pivot pin means for snubbing pivotal movement between said aircraft bin and said aircraft cavity.

* * * * *